United States Patent
Suzuki et al.

(10) Patent No.: US 11,923,776 B2
(45) Date of Patent: Mar. 5, 2024

(54) DC POWER SUPPLY DEVICE AND AIR CONDITIONER

(71) Applicant: Mitsubishi Electric Corporation, Tokyo (JP)

(72) Inventors: Hiroki Suzuki, Tokyo (JP); Keiichiro Shizu, Tokyo (JP); Tomohiro Kutsuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 410 days.

(21) Appl. No.: 17/429,079

(22) PCT Filed: Apr. 12, 2019

(86) PCT No.: PCT/JP2019/016020
§ 371 (c)(1),
(2) Date: Aug. 6, 2021

(87) PCT Pub. No.: WO2020/208822
PCT Pub. Date: Oct. 15, 2020

(65) Prior Publication Data
US 2022/0140736 A1    May 5, 2022

(51) Int. Cl.
*H02M 3/335*        (2006.01)
*F25B 31/02*        (2006.01)
(Continued)

(52) U.S. Cl.
CPC ....... *H02M 3/33569* (2013.01); *F25B 31/026* (2013.01); *H02M 1/083* (2013.01); *H02P 27/06* (2013.01)

(58) Field of Classification Search
CPC .. H02M 3/33569; H02M 1/083; H02M 3/158; H02M 7/06; F25B 2600/024; F25B 2600/021; H02P 27/06
See application file for complete search history.

(56) References Cited

U.S. PATENT DOCUMENTS 6,181,583 B1 *   1/2001   Okui ................... H02M 1/4208
                                                      363/45
9,692,289 B2 *   6/2017   Kamiya ................... H02P 6/14
(Continued)

FOREIGN PATENT DOCUMENTS

| JP | 2016-214015 A | 12/2016 |
| JP | 2018-068028 A | 4/2018 |
| WO | 2015/063869 A1 | 5/2015 |

OTHER PUBLICATIONS

International Search Report of the International Searching Authority dated Jun. 18, 2019, for the corresponding International application No. PCT/JP2019/016020 (and English translation).

*Primary Examiner* — Lionel Nouketcha
(74) *Attorney, Agent, or Firm* — POSZ LAW GROUP, PLC (57) ABSTRACT

A DC power supply device includes: a rectifier circuit; a reactor connected at one end to one output terminal of the rectifier circuit; a charging unit including a first and second switching element connected in series between another end of the reactor and another output terminal of the rectifier circuit, the charging unit configured to charge a first and second capacitor connected in series between output terminals to which a load is connected; and a control unit that controls the charging unit. The control unit sets, based on the timing at which the zero-crossing occurs, a dead time in which both the and second switching element are off, and when states of the first and second switching element at a time of occurrence of the zero-crossing match a predetermined set of states, reverses the states of the first switching element and the second switching element.

18 Claims, 10 Drawing Sheets

(51) Int. Cl.
*H02M 1/08* (2006.01)
*H02P 27/06* (2006.01)

(56) References Cited

U.S. PATENT DOCUMENTS 9,816,737 B2 11/2017 Kamiya et al.
2016/0265822 A1* 9/2016 Kamiya .................. H02M 1/12

* cited by examiner

DC POWER SUPPLY DEVICE AND AIR CONDITIONER

CROSS REFERENCE TO RELATED APPLICATION

This application is a U.S. national stage application of International Patent Application No. PCT/JP2019/016020 filed on Apr. 12, 2019, the disclosure of which is incorporated herein by reference.

TECHNICAL FIELD

The present invention relates to a DC power supply device and an air conditioner.

BACKGROUND

Devices such as air conditioners, refrigerators, freezers, and heat pump water heaters are equipped with a DC power supply device that converts AC into DC. In these devices, an inverter is connected to the DC power supply device as a load to drive the compressor motor. For example, Patent Literature 1 discloses a DC power supply device capable of reducing harmonics and improving power conversion efficiency to save energy.

Patent Literature

Patent Literature 1: Japanese Patent Application Laid-open No. 2018-68028

According to the conventional technique described above, a dead time is provided in order to prevent a vertical short-circuit between switching elements when the on/off state of the switching elements is switched at the timing of a zero-crossing at which the AC power supply is switched from positive to negative. However, noise that can be mixed in the AC voltage supplied from the power supply or some other factor may cause a deviation of zero-crossing timing from the cycle, in which case it may or may not be possible to prevent a vertical short-circuit between switching elements depending on the zero-crossing timing, which is problematic.

SUMMARY

The present invention has been made in view of the above, and an object thereof is to provide a DC power supply device capable of preventing a vertical short-circuit between switching elements and preventing breakdown of elements and heat damage to the circuit.

In order to solve the above-described problems and achieve the object, a DC power supply device according to the present invention includes: a rectifier circuit that converts AC power into DC power; a reactor connected at one end to one output terminal of the rectifier circuit; and a charging unit including a first switching element and a second switching element connected in series between another end of the reactor and another output terminal of the rectifier circuit, the charging unit being configured to charge a first capacitor and a second capacitor connected in series between output terminals to which a load is connected. The DC power supply device also includes a control unit that controls the charging unit in synchronization with a timing at which a zero-crossing occurs in a line voltage of the AC power. The control unit sets, based on the timing at which the zero-crossing occurs, a dead time in which both the first switching element and the second switching element are off, and when states of the switching element and the second switching element at a time of occurrence of the zero-crossing match a predetermined set or states, reverses the states of the first switching element and the second switching element.

The DC power supply device according to the present invention can achieve the effect of avoiding a vertical short-circuit between switching elements in the event of a deviation between dead time and zero-crossing timing, and preventing breakdown of elements and heat damage to the circuit.

DETAILED DESCRIPTION

Hereinafter, a DC power supply device and an air conditioner according to embodiments of the present invention will be described detail based on the drawings. The present invention is not limited to the embodiments.

First Embodiment

Figure 1:
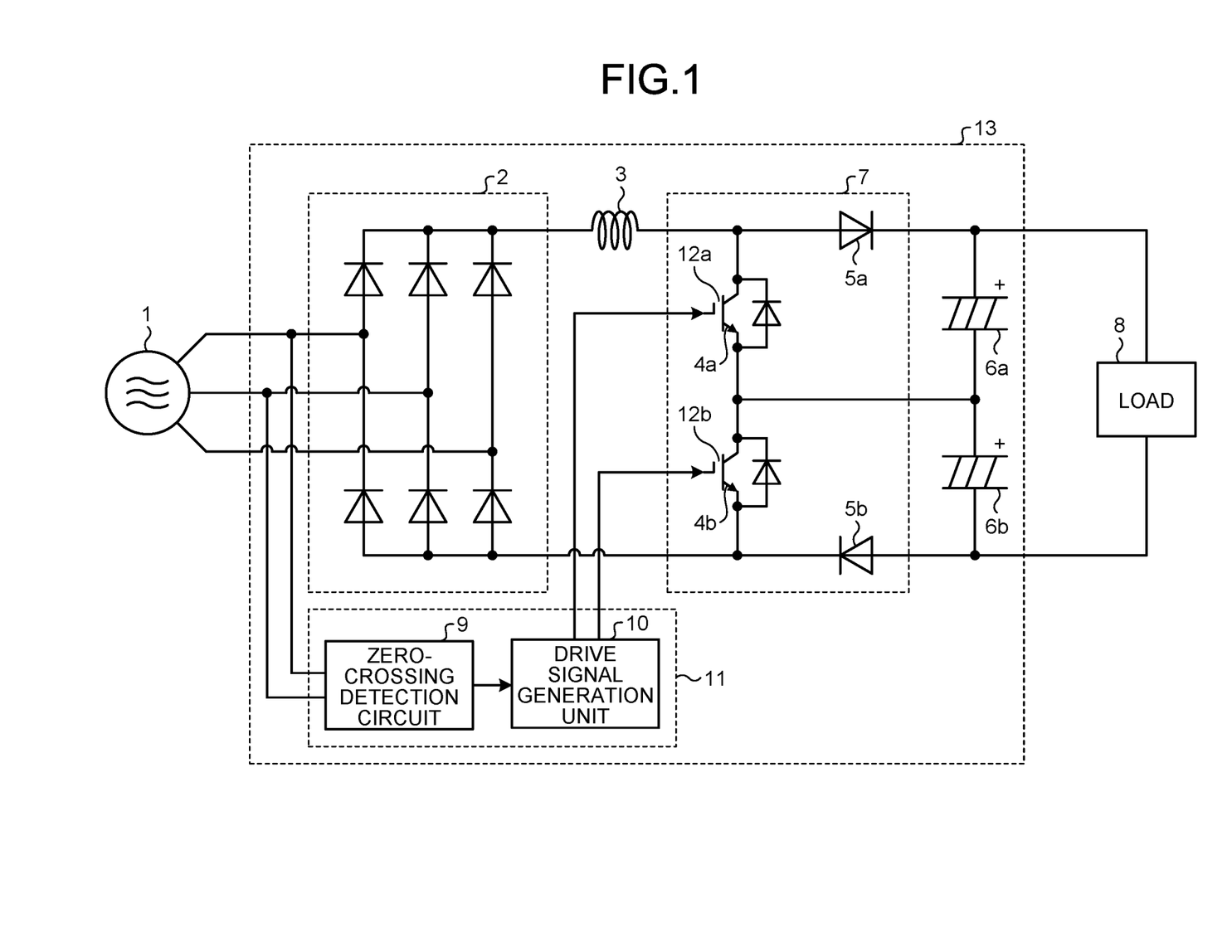
FIG. 1 is a diagram illustrating an exemplary configuration of a DC power supply device according to a first embodiment.

FIG. 1 is a diagram illustrating an exemplary configuration of a DC power supply device according to the first embodiment. The DC power supply device 13 according to the present embodiment is a converter that converts AC power supplied frog a three-phase AC power supply 1 into DC power and outputs the DC power to a load 8. The load 8 can be exemplified by an inverter that drives the motor of a compressor used in an air conditioner.

The DC power supply device 13 includes a rectifier circuit 2 that rectifies AC power from the three-phase AC power supply 1 and outputs DC power, a reactor 3 connected to the output terminal on the positive electrode side of the rectifier circuit 2, a charging unit 7 that charges a capacitor 6a and a capacitor 6b connected in series between the output terminals to the load 8, and a control unit 11 that controls the charging unit 7. Note that the reactor 3 may be connected to the output terminal on the negative electrode side of the rectifier circuit 2.

The rectifier circuit 2 is a three-phase full-wave rectifier circuit in which rectifier diodes are full-bridge connected.

The reactor 3 is illustrated as a DC reactor placed on the output side of the rectifier circuit 2, but may be an AC reactor placed on the input side of the rectifier circuit 2.

The charging unit 7 includes a switching element 4a that is a first switching element, a switching element 4b that is a second switching element, a backflow prevention diode 5a that is a first backflow prevention diode, and a backflow prevention diode 5b that is a second backflow prevention diode.

The switching elements 4a and 4b are, for example, insulated gate bipolar transistors (IGBTs), power metal-oxide-semiconductor field-effect transistors (MOSFETs), or power transistors. The switching element 4a and the switching element 4b are controlled to be on/off by a drive signal 12a and a drive signal 12b, respectively.

When the drive signal 12a is High (Hi), the switching element 4a is on so that the capacitor 6b is charged. When the drive signal 12b is Hi, the switching element 4b is on so that the capacitor 6a is charged. Note that a different circuit configuration may be employed in which the switching elements are on when the drive signals are Low (Lo).

The backflow prevention diode 5a is provided in the forward direction from the collector or drain of the switching element 4a toward the connection point between the capacitor 6a and the load 8. The backflow prevention diode 5b is provided in the forward direction from the connection point between the capacitor 6b and the load 8 toward the emitter or drain of the switching element 4b.

The backflow prevention diode 5a prevents the charge stored in the capacitor 6a from flowing backward. The backflow prevention diode 5b prevents the charge stored in the capacitor 6b from flowing backward.

The connection point between the switching element 4a and the switching element 4b and the connection point between the capacitor 6a and the capacitor 6b are connected.

The control unit 11 includes a zero-crossing detection circuit 9 and a drive signal generation unit 10. The zero-crossing detection circuit 9 observes the state of two out of the three phases output from the three-phase AC power supply 1, and detects a zero-crossing point that is a timing at which a line voltage, i.e. voltage between the two phases to be observed, switches from positive to negative or from negative to positive. The zero-crossing detection circuit 9 outputs a zero-crossing signal that is Hi when the line voltage is positive and is Lo when the line voltage is negative. That is, a timing at which the zero-crossing signal switches between Hi and Lo is a zero-crossing point. The drive signal generation unit 10 generates the drive signals 12a and 12b at the timing that is based on the result of detection of a zero-crossing point by the zero-crossing detection circuit 9. The control unit 11 performs on/off control of the switching element 4a using the drive signal 12a generated by the drive signal generation unit 10, and performs on/off control of the switching element 4b using the drive signal 12b. Switching control that is performed by the control unit 11 will be described below with reference to FIG. 2.

Figure 2:
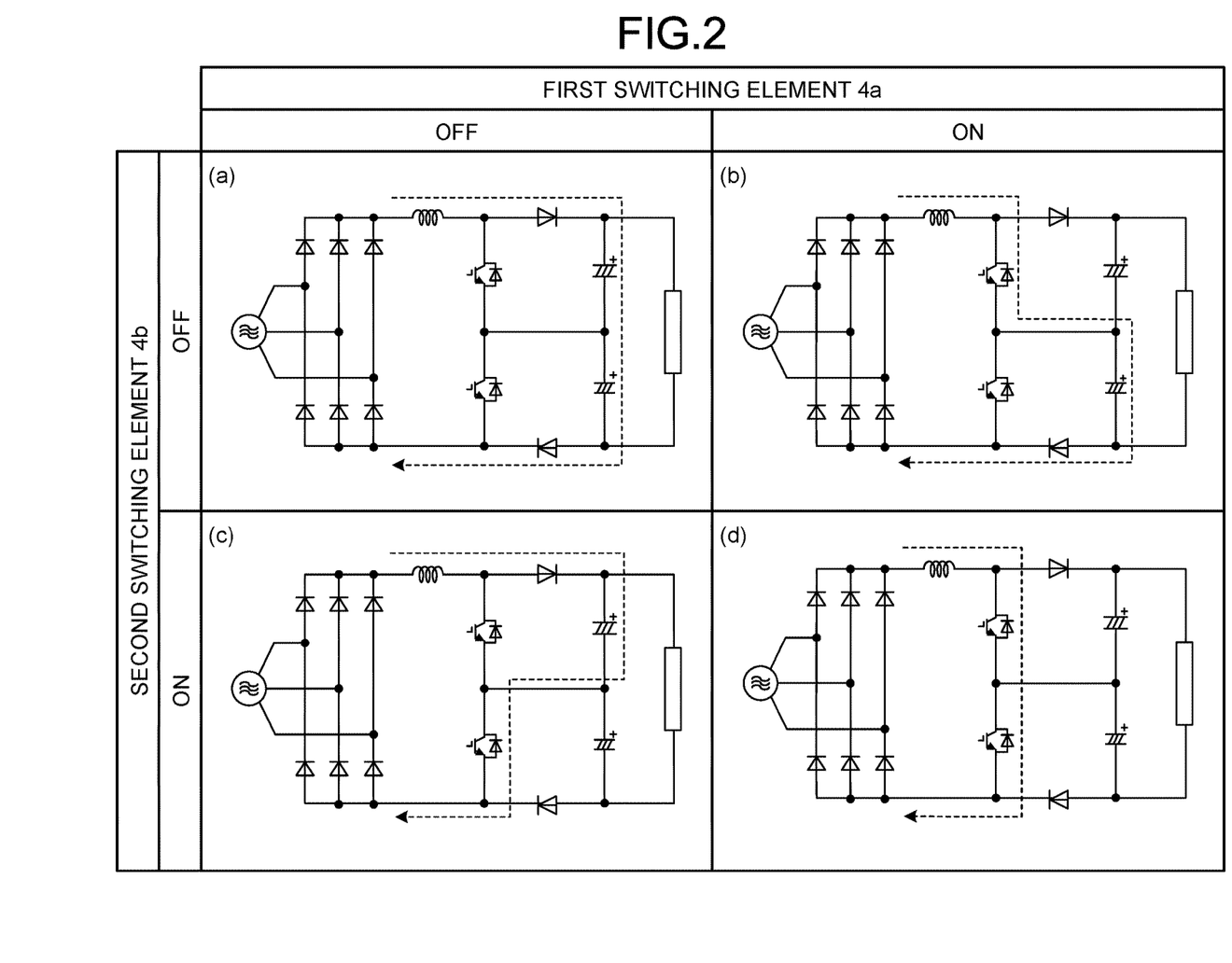
FIG. 2 is a diagram for explaining the operation of the control unit included in the DC power supply device according to the first embodiment.

FIG. 2 is a diagram for explaining the operation of the control unit 11 included in the DC power supply device 13 according to the first embodiment. Specifically, FIG. 2 is a diagram illustrating the relationship between the states of the switching element 4a and the switching element 4b and current paths and the capacitors 6a and 6b to be charged according to the present embodiment.

In (a) of FIG. 2, both the switching element 4a and the switching element 4b are off, and a charging current flows through the capacitor 6a and the capacitor 6b.

In (b) of FIG. 2, the switching element 4a is on, the switching element 4b is off, and a charging current flows through the capacitor 6b.

In (c) of FIG. 2, the switching element 4a is off, the switching element 4b is on, and a charging current flows through the capacitor 6a.

In (d) of FIG. 2, both the switching element 4a and the switching element 4b are on, and a current flows to cause a short-circuit between the output terminals of the rectifier circuit 2 via the switching element 4a and the switching element 4b.

As the control of the control unit 11, by alternately repeating (b) and (c) of FIG. 2, that is, by alternately turning on the switching element 4a and the switching element 4b, the capacitor 6a and the capacitor 6b are alternately charged, and the DC voltage to be supplied to the load 8 is boosted.

When the DC voltage is boosted, the timing at which the switching element 4a is turned on and the timing at which the switching element 4b is turned off are ideally the same, and so are the timing at which the switching element 4a is turned off and the timing at which the switching element 4b is turned on. However, if the control timing deviates from the ideal timing, the switching elements 4a and 4b will be simultaneously on, causing a vertical short-circuit. Therefore, for turning on and off the switching elements 4a and 4b, the control unit 11 provides a dead time as a short-circuit prevention time to prevent the switching elements 4a and 4b from being simultaneously on.

In addition, the control unit 11 controls the switching of the switching elements 4a and 4b in synchronization with the zero-crossing signal detected by the zero-crossing detection circuit 9 for the purpose of power stabilization, harmonic reduction, and the like. The term "synchronization" as used herein means that the relationship between the timing at which a zero-crossing occurs and the timing at which the switching elements 4a and 4b are switched is constant. Specifically, it means that the time from the occurrence of a zero-crossing to switching is constant. Because zero-crossings occur at regular intervals, the control unit 11 sets, as a dead time, a certain range centered on the timing at which a zero-crossing is scheduled to occur. Here, how the control unit 11 sets a dead time will be described. Consider an exemplary case where a dead time is set when the switching element 4a is off and the switching element 4b is on. The control unit 11 sets a dead time based on the timing of detection of a zero-crossing point by the zero-crossing detection circuit 9. Specifically, in response to the zero-crossing detection circuit 9 detecting a zero-crossing point while the switching element 4a is off and the switching element 4b is on, the control unit 11 sets the drive signal 12a to Lo and the drive signal 12b to Hi, and starts counting the elapsed time from the detection of the zero-crossing point. Thereafter, at the time that a predetermined constant time T1 has elapsed, the control unit 11 sets the drive signal 12b to Lo so that both the switching elements 4a and 4b are off. At the time that another constant time T2 has elapsed, the control unit 11 sets the drive signal 12a to Hi to turn on the switching element 4a. By controlling the drive signals in such a procedure, the control unit 11 sets a dead time and switches the switching elements 4a and 4b.

However, noise that can be mixed in the voltage output from the three-phase AC power supply 1 or some other factor may cause a zero-crossing at a timing different from the scheduled timing, in which case if the on/off switching of the switching elements 4a and 4b is performed in synchronization with the zero-crossing, both the switching elements 4a and 4b may be turned on. Examples of such a case are illustrated in FIGS. 3 and 4.

Figure 3:
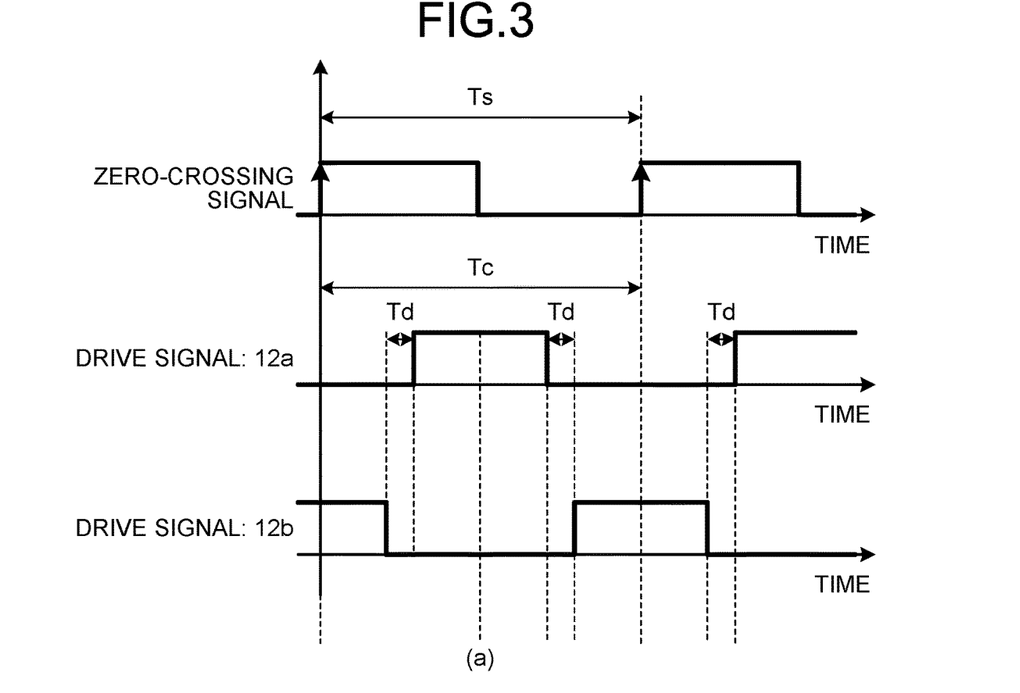
FIG. 3 is a diagram illustrating an example of the relationship between drive signals for driving switching elements and a zero-crossing signal.
Figure 4:
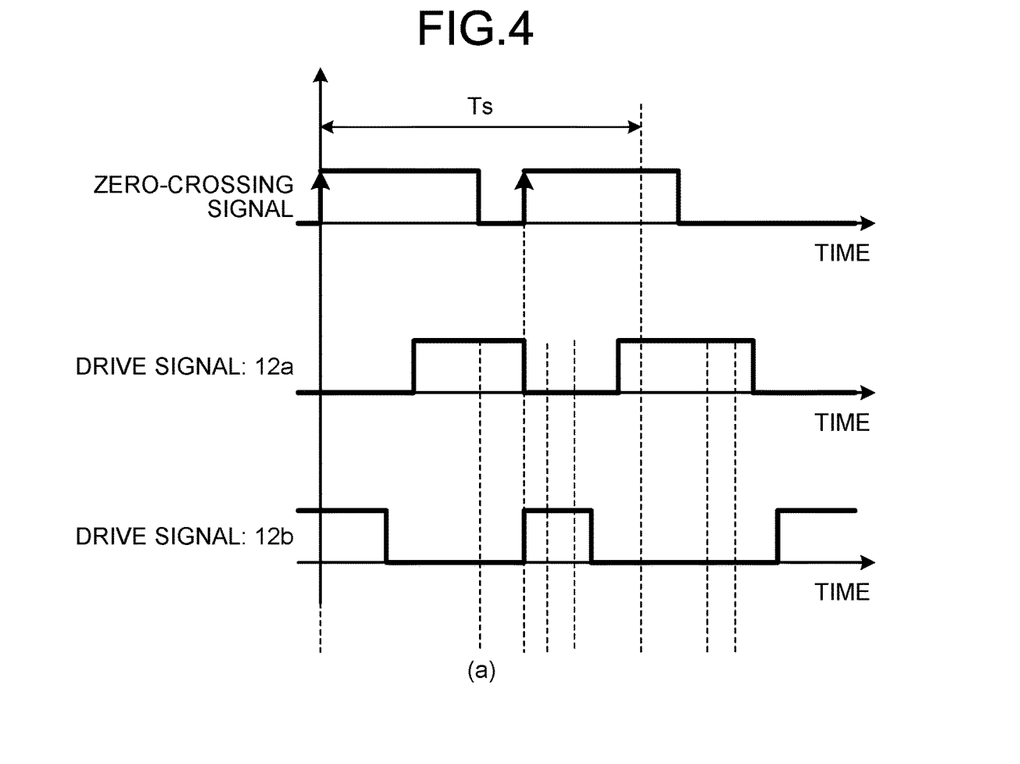
FIG. 4 is a diagram illustrating another example of the relationship between drive signals for driving switching elements and a zero-crossing signal.

FIG. 3 is a diagram illustrating an example of the relationship between the drive signals 12a and 12b for driving the switching elements 4a and 4b and the zero-crossing signal. FIG. 4 is a diagram illustrating another example of the relationship between the drive signals 12a and 12b for driving the switching elements 4a and 4b and the zero-crossing signal. Note that in the present embodiment, the switching of the switching elements 4a and 4b is controlled in synchronization with the rising timing of the zero-crossing signal (timing of switching from Lo to Hi).

Suppose that the cycle of the three-phase AC output from the three-phase AC power supply 1 is Ts, that is, the cycle of the zero-crossing signal is Ts, and the drive signal 12a and the drive signal 12b are alternately reversed at the cycle Tc. In this case, as long as the length of the cycle Ts matches the length of the cycle Tc, as illustrated in FIG. 3, a vertical short-circuit between the switching elements 4a and 4b will not occur even when the control unit 11 performs the on/off switching of the switching elements 4a and 4b in synchronization with the zero-crossing, that is, even when the control unit 11 executes the above procedure to perform control for setting a dead time with the occurrence of the zero-crossing.

However, if the zero-crossing timing deviates from the dead time cycle Ts due to factors such as noise mixed in the voltage of the three-phase AC power supply 1, problems will arise. For example, suppose that a deviation of zero-crossing timing occurs and the zero-crossing signal is reversed at the time of (a) illustrated in FIG. 4. In this case, if the switching elements 4a and 4b are controlled in synchronization with this timing, that is, if the drive signal 12a is set to Lo and the drive signal 12b is set to Hi in accordance with the procedure for dead time setting described above, the switching elements 4a and 4b be simultaneously on, and a vertical short-circuit will occur, causing breakdown of elements on the path of current flow and heat damage to the circuit.

Therefore, in the DC power supply device 13 according to the present embodiment, criteria for the drive signals are defined: Lo designated for the drive signal 12a and Hi is designated for the drive signal 12b, and the drive signals 12a and 12b are compared with the criteria at the zero-crossing timing. In a case where the drive signals do not match the criteria, both the drive signals 12a and 12b are switched to Lo, and a procedure of newly setting a dead time starting from the zero-crossing timing is performed, for example, thereby preventing a vertical short-circuit between the switching element 4a and the switching element 4b.

Note that the examples illustrated in FIGS. 3 and 4 show control patterns for outputting one drive signal every half cycle of the zero-crossing signal, which are non-limiting examples of output patterns. Alternatively, one drive signal may be output every 1/n cycle of the zero-crossing signal, or one drive signal may be output every n cycles of the zero-crossing signal. Here, reference character "n" is a positive integer.

Figure 5:
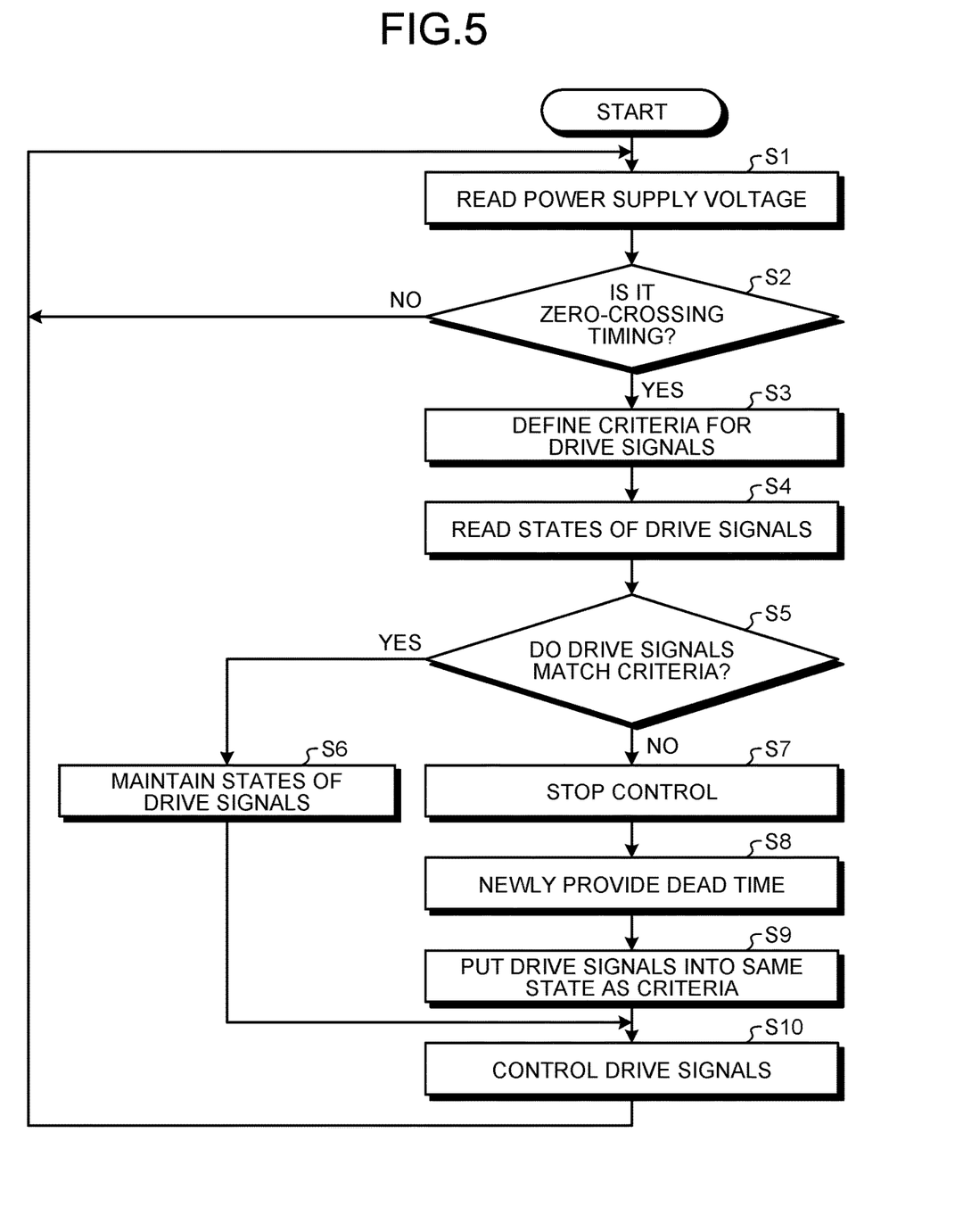
FIG. 5 is a flowchart illustrating an example of the operation of the control unit of the DC power supply device according to the first embodiment.

FIG. 5 is a flowchart illustrating an example of the operation of the control unit 11 of the DC power supply device 13 according to the first embodiment. Specifically, FIG. 5 is a flowchart illustrating how the control unit 11 generates drive signals for preventing a vertical short-circuit between the switching element 4a and the switching element 4b. Note that the control illustrated in FIG. 5 is periodically repeated at regular intervals.

Upon starting the operation, the control unit 11 first reads a power supply voltage Vs between two out of the three phases output from the three-phase AC power supply 1 (step S1), and determines whether it is a zero-crossing timing based on the power supply voltage Vs (step S2). These steps S1 and S2 are performed by the zero-crossing detection circuit 9.

When it is not a zero-crossing timing (step S2: Nb), the control unit 11 returns to step S1, and reads the power supply voltage Vs again after a lapse of a predetermined time. On the other hand, when it is a zero-crossing timing (step S2: Yes), the drive signal generation unit 10 defines a criterion for each of the drive signal 12a and the drive signal 12b (step S3). In the present embodiment, the drive signal generation unit 10 designates Lo and Hi as the criteria for the drive signal 12a and the drive signal 12b, respectively.

Next, the drive signal generation unit 10 reads the states of the drive signals 12a and 12b (step S4), and checks whether the drive signals match the criteria (step S5). In response to determining that the drive signals match the criteria, that is, the drive signal 12a is Lo and the drive signal 12b is Hi (step S5: Yes), the drive signal generation unit 10 maintains the states of the drive signals (step S6).

In response to determining that the drive signals do not match the criteria, that is, the states do not indicate that the drive signal 12a is Lo and the drive signal 12b is Hi (step S5: No), the drive signal generation unit 10 stops the control for the charging unit 7 (step S7). Next, the drive signal generation unit 10 switches both the drive signals 12a and 12b to Lo and newly provides a dead time (step S8). Then, the drive signal generation unit 10 puts the drive signals 12a and 12b into the same state as the criteria, that is, sets the drive signal 12a to Lo and the drive signal 12b to Hi (step S9). After executing step S6 and after executing step S9, the drive signal generation unit 10 controls the drive signals 12a and 12b (step S10).

Next, how the control unit 11 generates drive signals will be described in detail with reference to FIGS. 6 to 8.

Figure 6:
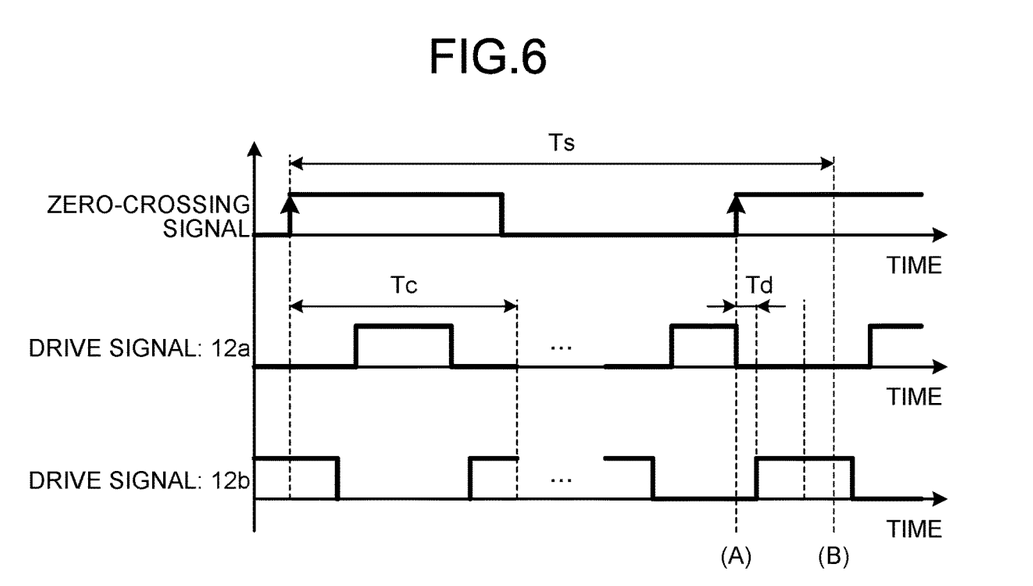
FIG. 6 is a diagram illustrating a first example of the control operation of the control unit included in the DC power supply device according to the first embodiment.

FIG. 6 is a diagram illustrating a first example of the control operation of the control unit 11 included in the DC power supply device 13 according to the first embodiment. FIG. 6 is a time chart illustrating the control operation for the drive signals 12a and 12b in the case that a zero-crossing occurs when the drive signal 12a is Hi and the drive signal 12b is Lo. In the case of the example illustrated in FIG. 6, the zero-crossing occurs at the timing when the drive signals 12a and 12b do not match the criteria (drive signal 12a=Lo, drive signal 12b=Hi). In this case, the drive signal generation unit 10 compares the states of the drive signal 12a and the drive signal 12b with the criteria at the zero-crossing timing. Then, because the drive signals 12a and 12b do not match the criteria, the drive signal generation unit 10 switches both the drive signals 12a and 12b to Lo, newly sets a dead time Td, and then switches the drive signal 12b, which has been Lo, to Hi.

Figure 7:
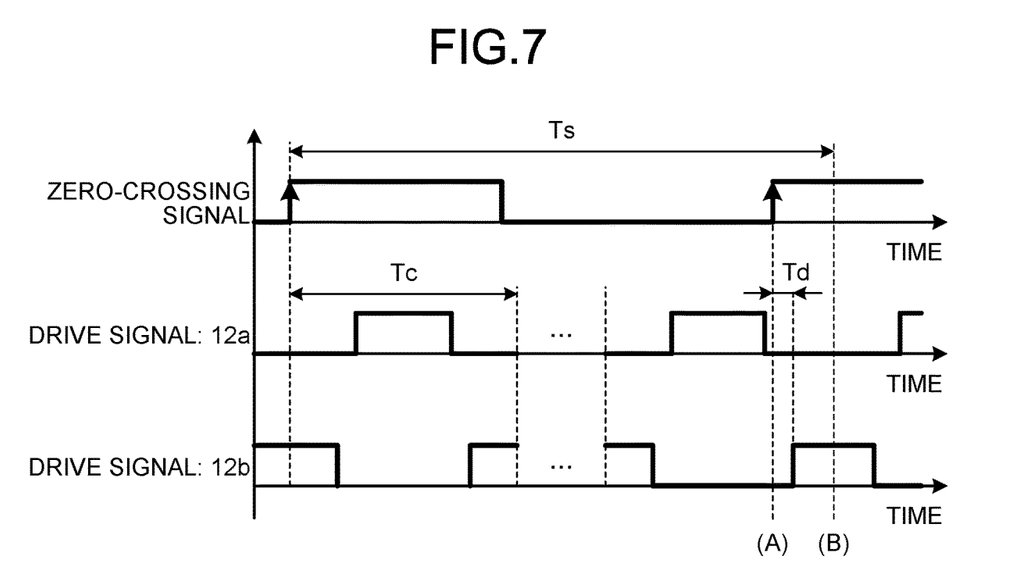
FIG. 7 is a diagram illustrating a second example of the control operation of the control unit included in the DC power supply device according to the first embodiment.

FIG. 7 is a diagram illustrating a second example of the control operation of the control unit 11 included in the DC power supply device 13 according to the first embodiment. FIG. 7 is a time chart illustrating the control operation for the drive signals 12a and 12b in the case that a zero-crossing occurs when the drive signal 12a is Lo and the drive signal 12b is Lo. In the case of the example illustrated in FIG. 7, the zero-crossing occurs at the timing when the drive signals 12a and 12b do not match the criteria (drive signal 12a=Lo, drive signal 12b=Hi). In this case, the drive signal generation unit 10 compares the states of the drive signal 12a and the drive signal 12b with the criteria at the zero-crossing timing. Then, because the drive signals 12a and 12b do not match the criteria, the drive signal generation unit 10 switches both the drive signals 12a and 12b to Lo, newly sets the dead time Td, and then switches the drive signal 12b, which has been Lo, to Hi.

Figure 8:
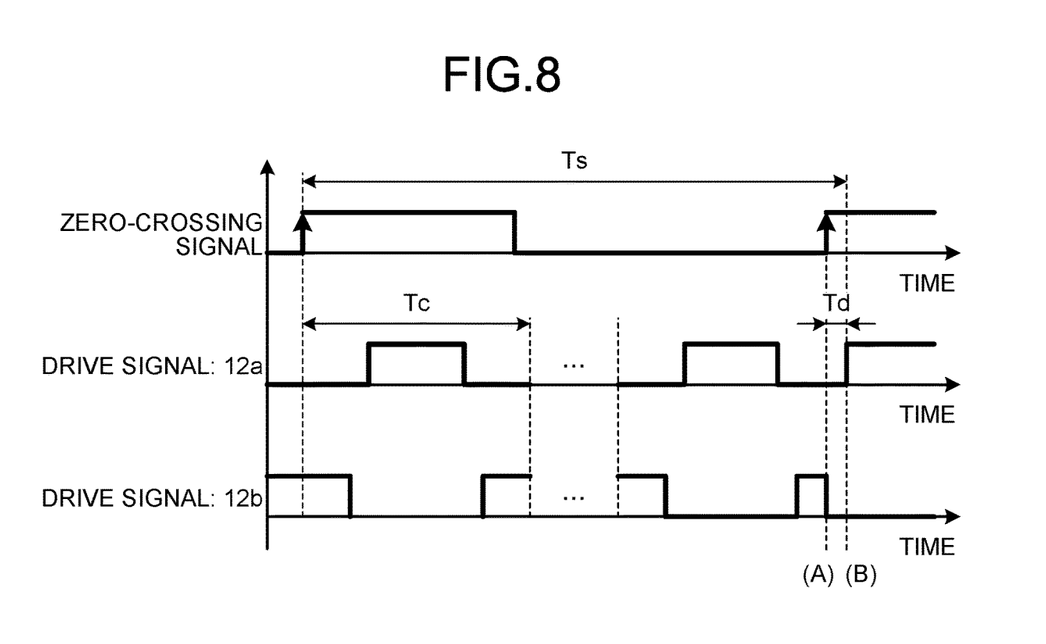
FIG. 8 is a diagram illustrating a third example of the control operation of the control unit included in the DC power supply device according to the first embodiment.

FIG. 8 is a diagram illustrating a third example of the control operation of the control unit 11 included in the DC power supply device 13 according to the first embodiment. FIG. 8 is a time chart illustrating the control operation for the drive signals 12a and 12b in the case that a zero-crossing occurs when the drive signal 12a is Lo and the drive signal 12b is Hi. In the case of the example illustrated in FIG. 8, the zero-crossing occurs at the timing when the drive signals 12a and 12b match the criteria (drive signal 12a=Lo, drive signal 12b=Hi). In this case, the drive signal generation unit 10 compares the states of the drive signal 12a and the drive signal 12b with the criteria at the zero-crossing timing. Then, because the drive signals 12a and 12b match the criteria, the drive signal generation unit 10 turns off both the switching elements 4a and 4b, and counts the elapsed time from the timing of the occurrence of the zero-crossing. Then, at the time that the predetermined constant time Td has elapsed, the drive signal generation unit 10 sets the drive signal 12a to Hi to turn on the switching element 4a.

As described above, the DC power supply device 13 according to the first embodiment checks, upon detecting a zero-crossing of the three-phase AC power supply 1, the states of the drive signals 12a and 12b for the switching element 4a and the switching element 4b connected in series to constitute the charging unit 7, and in response to determining that it is not a dead time, that is, the states of the drive signals 12a and 12b do not match the criteria, newly sets a dead time, and then switches the drive signal 12a to Hi. As a result, it is possible to implement a DC power supply device capable of avoiding a vertical short-circuit between switching elements in the event of a deviation between dead time and zero-crossing timing, and preventing breakdown of elements and heat damage to the circuit.

Second Embodiment

The DC power supply device according to the second embodiment has the same configuration as the DC power supply device 13 according to the first embodiment, and is partially different in operation. The present embodiment describes an operation different from that of the first embodiment, specifically, on/off control of the switching element 4a and the switching element 4b of the charging unit 7 illustrated FIG. 1.

The DC power supply device 13 according to the first embodiment is configured to switch the drive signals 12a and 12b directly in a case where the drive signals match the criteria when a zero-crossing occurs, and switch the drive signals after newly providing a dead time in a case where the drive signals do not match the criteria. On the other hand, the DC power supply device 13 according to the present embodiment waits for the next dead time without newly providing a dead time in a case where the drive signals 12a and 12b do not match the criteria, and switches the drive signals in the next dead time.

Figure 9:
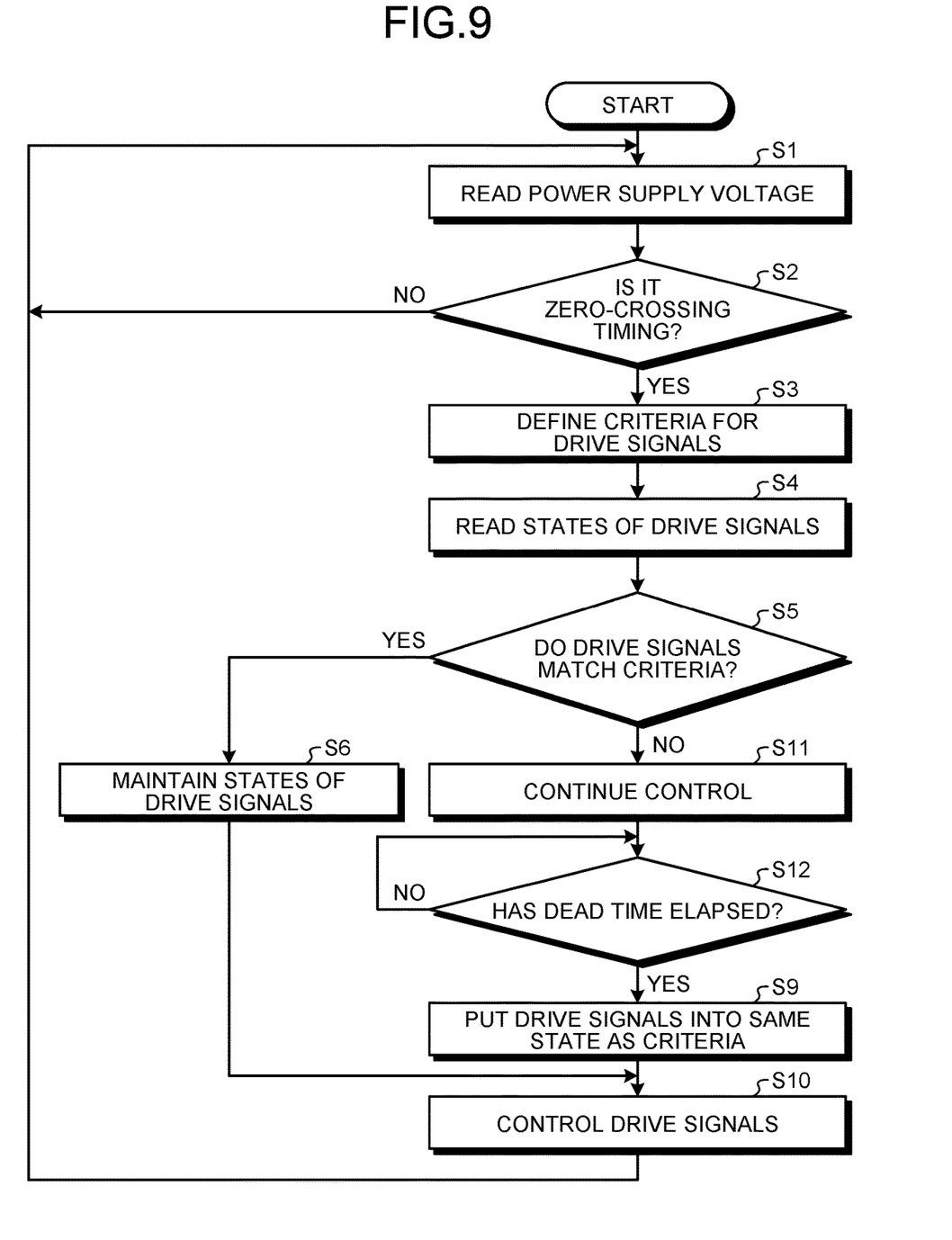
FIG. 9 is a flowchart illustrating an example of the operation of the control unit of the DC power supply device according to a second embodiment.

FIG. 9 is a flowchart illustrating an example of the operation of the control unit 11 of the DC power supply device 13 according to the second embodiment. The flowchart illustrated in FIG. 9 is obtained by replacing S7 and S8 of the flowchart illustrated in FIG. 5 with steps S11 and S12. The present embodiment describes steps S11 and S12, which are different from the operation of the first embodiment.

In response to determining in step S5 that the drive signals do not match the criteria (step S5: Nb), the control unit 11 of the DC power supply device 13 according to the second embodiment continues the control without newly providing a dead time (step S11). However, the control unit 11 does not switch the drive signals 12a and 12b in step S11. Thereafter, the control unit 11 repeatedly checks whether the next dead time has elapsed (step S12: No), and in response to determining that the dead time has elapsed (step S12: Yes), puts the drive signals into the same state as the criteria (step S9). In step S12, the control unit 11 checks whether the elapsed time from the end of the previous dead time has reached the time corresponding to the cycle Ts of the zero-crossing signal, and in response to determining that the elapsed time has reached the time corresponding to the cycle Ts, proceeds to step S10.

Next, how the control unit 11 generates drive signals according to the second embodiment will be described in detail with reference to FIGS. 10 to 12.

Figure 10:
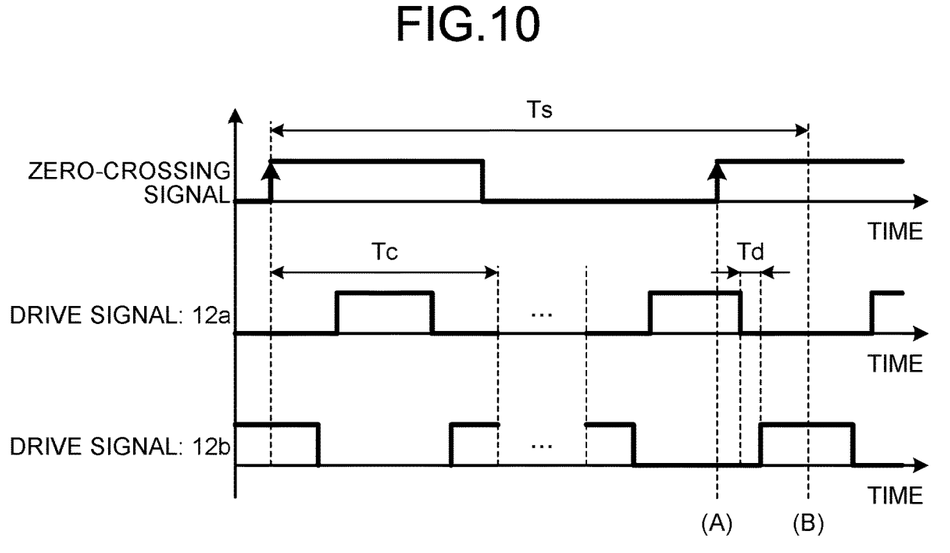
FIG. 10 is a diagram illustrating a first example of the control operation of the control unit included in the DC power supply device according to the second embodiment.

FIG. 10 is a diagram illustrating a first example of the control operation of the control unit 11 included in the DC power supply device 13 according to the second embodiment. FIG. 10 is a time chart illustrating the control operation for the drive signals 12a and 12b in the case that a zero-crossing occurs when the drive signal 12a is Hi and the drive signal 12b is Lo. In the case of the example illustrated in FIG. 10, the zero-crossing occurs at the timing when the drive signals 12a and 12b do not match the criteria (drive signal 12a=Lo, drive signal 12b=Hi). In this case, the drive signal generation unit 10 compares the states of the drive signal 12a and the drive signal 12b with the criteria at the zero-crossing timing. Then, because the drive signals 12a and 12b do not match the criteria, the drive signal generation unit 10 continues the control without switching the drive signals 12a and 12b. Thereafter, the dead time Td arrives, the dead time Td elapses, and then the drive signal 12b is switched to Hi.

Figure 11:
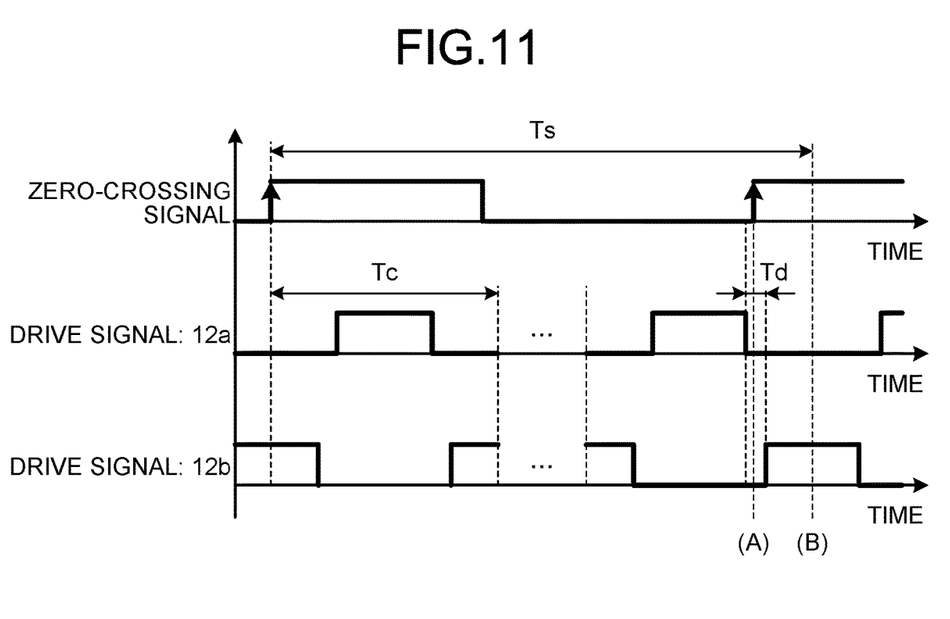
FIG. 11 is a diagram illustrating a second example of the control operation of the control unit included in the DC power supply device according to the second embodiment.

FIG. 11 is a diagram illustrating a second example of the control operation of the control unit 11 included in the DC power supply device 13 according to the second embodiment. FIG. 11 is a time chart illustrating the control operation for the drive signals 12a and 12b in the case that a zero-crossing occurs when the drive signal 12a is ho and the drive signal 12b is Lo. In the case of the example illustrated in FIG. 11, the zero-crossing occurs at the timing when the drive signals 12a and 12b do not match the criteria (drive signal 12a==Lo, drive signal 12b=Hi). In this case, the drive signal generation unit 10 compares the states of the drive signal 12a and the drive signal 12b with the criteria at the zero-crossing timing. Then, because the drive signals 12a and 12b do not match the criteria, the drive signal generation unit 10 continues the control without switching the drive signals 12a and 12b. Thereafter, the dead time Td elapses, and then the drive signal 12b is switched to Hi.

Figure 12:
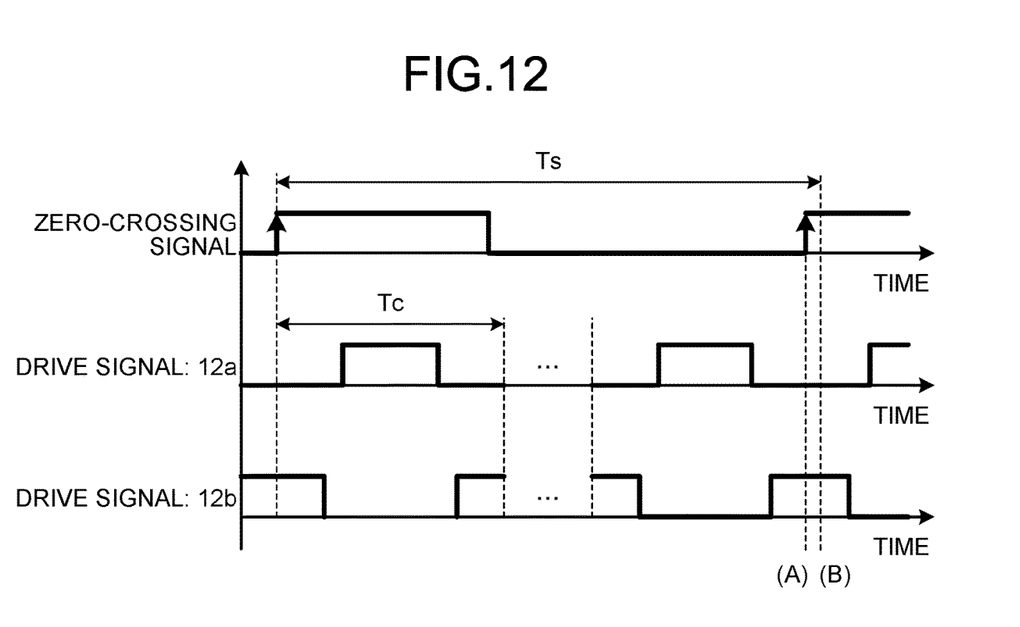
FIG. 12 is a diagram illustrating a third example of the control operation of the control unit included in the DC power supply device according to the second embodiment.

FIG. 12 is a diagram illustrating a third example of the control operation of the control unit 11 included in the DC power supply device 13 according to the second embodiment. FIG. 12 is a time chart illustrating the control operation for the drive signals 12a and 12b in the case that a zero-crossing occurs when the drive signal 12a is to and the drive signal 12b is Hi. In the case of the example illustrated in FIG. 12, the zero-crossing occurs at the timing when the drive signals 12a and 12b match the criteria (drive signal 12a=Lo, drive signal 12b=Hi). In this case, the drive signal generation unit 10 compares the states of the drive signal 12a and the drive signal 12b with the criteria at the zero-crossing timing. Then, because the drive signals 12a and 12b match the criteria, the drive signal generation unit 10 maintains the states of the drive signals 12a and 12b.

As described above, the DC power supply device 13 according to the second embodiment checks, upon detecting a zero-crossing of the three-phase AC power supply 1, the states of the drive signals 12a and 12b for the switching element 4a and the switching element 4b connected in series to constitute the charging unit 7, and in response to determining that it is not a dead time, that is, the states of the drive signals 12a and 12b do not match the criteria, waits for the next dead time by continuing the control operation without switching the drive signals 12a and 12b, and after a lapse of the next dead time, switches the drive signal 12b to Hi. As a result, effects similar to those of the DC power supply device 13 according to the first embodiment can be obtained. That is, it is possible to implement a DC power supply device capable of preventing a vertical short-circuit between switching elements in the event of a deviation between dead time and zero-crossing timing, and preventing breakdown of elements and heat damage to the circuit.

Figure 13:
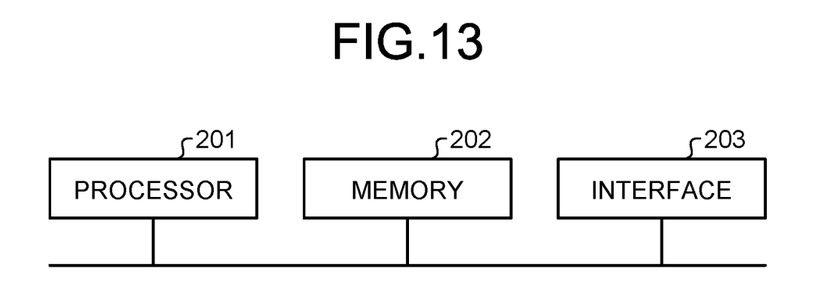
FIG. 13 is a diagram illustrating an example of hardware for implementing the control unit of the DC power supply device according to the first and second embodiments.

Next, hardware for implementing the control unit 11 of the DC power supply device 13 according to the first and second embodiments will be described. FIG. 13 is a diagram illustrating an example of hardware for implementing the control unit 11 of the DC power supply device 13 according to the first and second embodiments.

The control unit 11 of the DC power supply device 13 according to the first and second embodiments can be implemented by a processor 201, a memory 202, and an interface 203 illustrated in FIG. 13.

The processor 201 is a central processing unit (CPU, also referred to as a central processing device, a processing device, a computation device, a microprocessor, a microcomputer, a processor, or a digital signal processor (DSP)). The memory 202 is, for example, a volatile or non-volatile semiconductor memory such as a random access memory (RAM), a read only memory (ROM), a flash memory, an erasable programmable read only memory (EPROM), or an electrically erasable programmable read only memory (EEPROM, registered trademark). The interface 203 is a signal input/output circuit.

In a case where the control unit 11 of the DC power supply device 13 according to the first and second embodiments is implemented by the processor 201 and the memory 202 illustrated in FIG. 13, a program for operating as the control unit 11 is stored in the memory 202 in advance. The processor 201 operates as the control unit 11 by reading and executing the program stored in the memory 202.

Note that the processor 201 and the memory 202 illustrated in FIG. 13 are exemplified by a general-purpose processor and a general-purpose memory, respectively, but the control unit 11 can also be implemented by dedicated processing circuitry. The dedicated processing circuitry is, for example, a single circuit, a composite circuit, an application specific integrated circuit (ASIC), a field-programmable gate array (FPGA), or a circuit that is a combination thereof.

Third Embodiment

Figure 14:
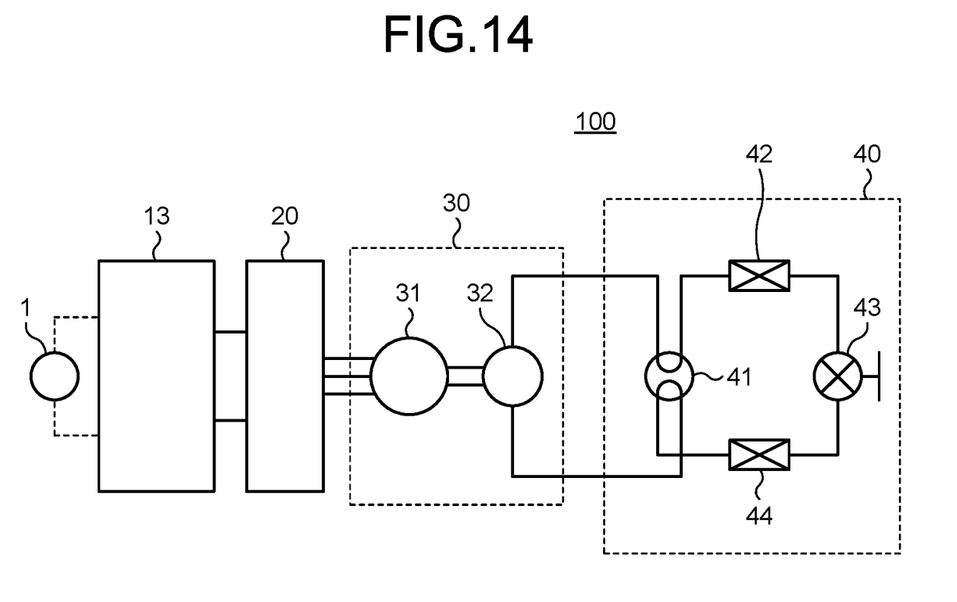
FIG. 14 is a diagram illustrating an exemplary configuration of an air conditioner according to a third embodiment.

FIG. 14 is a diagram illustrating an exemplary configuration of an air conditioner according to the third embodiment. The air conditioner 100 illustrated in FIG. 14 includes the DC power supply device 13 described in the first or second embodiment, and performs air conditioning using DC power generated by the DC power supply device 13.

As illustrated in FIG. 14, the air conditioner 100 according to the third embodiment includes the three-phase AC power supply 1, the DC power supply device 13 according to the first or second embodiment, an inverter 20, a compressor 30, and a refrigeration cycle 40.

The compressor 30 includes a motor 31 and a compression element 32 continued from the inverter 20. The refrigeration cycle 40 includes a four-way valve 41, an indoor heat exchanger 42, an expansion valve 43, and an outdoor heat exchanger 44. These components are connected via a refrigerant pipe.

The inverter 20 converts DC power output from the DC power supply device 13 into AC and supplies the AC to the motor 31 of the compressor 30. The motor 31 of the compressor 30 is driven by the supply of AC power from the inverter 20. The compression element 32 operates to compress the refrigerant in the refrigerant pipe along with the rotation of the motor 31, and circulates the refrigerant inside the refrigeration cycle 40.

In each of the embodiments described above, the DC power supply device 13 converts three-phase AC power output from the three-phase AC power supply 1 into DC power, but the present invention is not limited thereto. The DC power supply device may convert single-phase AC power into DC power. That is, the DC power supply device may be configured by replacing the rectifier circuit 2 illustrated in FIG. 1 with a rectifier circuit that converts single-phase AC power into DC power.

The configurations described in the above-mentioned embodiments indicate examples of the contents of the present invention. The configurations can be combined with another well-known technique, and some of the configurations can be omitted or changed in a range not departing from the gist of the present invention.

The invention claimed is:

1. A DC power supply device comprising:
   a rectifier circuit to convert AC power into DC power;
   a reactor connected at one end to one output terminal of the rectifier circuit;
   a charging circuitry including a first switching element and a second switching element connected in series between another end of the reactor and another output terminal of the rectifier circuit, the charging circuitry being configured to charge a first capacitor and a second capacitor connected in series between output terminals to which a load is connected; and
   a control circuitry to control the charging circuitry in synchronization with a timing at which a zero-crossing occurs in a line voltage of the AC power, wherein
   the control circuitry sets, based on the timing at which the zero-crossing occurs, a dead time in which both the first switching element and the second switching element are off, and in response to states of the first switching element and the second switching element at a time of occurrence of the zero-crossing matching a predetermined set of states, the control circuitry reverses the states of the first switching element and the second switching element.

2. The DC power supply device according to claim 1, wherein
when the states of the first switching element and the second switching element at the time of occurrence of the zero-crossing do not match the predetermined set of states, the control circuitry performs control to turn off both the first switching element and the second switching element, newly sets a dead time, and then turns on the first switching element or the second switching element.

3. The DC power supply device according to claim 2, wherein
for reversing the states of the first switching element and the second switching element, the control circuitry first performs control to turn off the first switching element and turn on the second switching element, performs control to turn off the second switching element after a lapse of a first constant time, performs control to turn on the first switching element after a lapse of a second constant time, and sets the dead time.

4. The DC power supply device according to claim 3, wherein
the control circuitry determines that the first switching element and the second switching element are in the predetermined set of states when the first switching element is off and the second switching element is on at the time of occurrence of the zero-crossing.

5. An air conditioner comprising:
the DC power supply device according to claim 4;
an inverter to convert DC power output from the DC power supply device into AC power; and
a compressor including a motor to be driven by supply of AC power from the inverter, the compressor being configured to compress a refrigerant inside a refrigeration cycle.

6. An air conditioner comprising:
the DC power supply device according to claim 3;
an inverter to convert DC power output from the DC power supply device into AC power; and
a compressor including a motor to be driven by supply of AC power from the inverter, the compressor being configured to compress a refrigerant inside a refrigeration cycle.

7. An air conditioner comprising:
the DC power supply device according to claim 2;
an inverter to convert DC power output from the DC: power supply device into AC power; and
a compressor including a motor to be driven by supply of AC power from the inverter, the compressor being configured to compress a refrigerant inside a refrigeration cycle.

8. The DC power supply device according to claim 1, wherein
when the states of the first switching element and the second switching element at the time of occurrence of the zero-crossing do not match the predetermined set of states, the control circuitry waits until a next dead time elapses without changing the states of the first switching element and the second switching element, and then turns on the first switching element or the second switching element.

9. The DC power supply device according to claim 8, wherein
for reversing the states of the first switching element and the second switching element, the control circuitry first performs control to turn off the first switching element and turn on the second switching element, performs control to turn off the second switching element after a lapse of a first constant time, performs control to turn on the first switching element after a lapse of a second constant time, and sets the dead time.

10. The DC power supply device according to claim 8, wherein
the control circuit determines that the first switching element and the second switching element are in the predetermined set of states when the first switching element is off and the second switching element is on at the time of occurrence of the zero-crossing.

11. An air conditioner comprising:
the DC power supply device according to claim 10;
inverter to convert DC power output from the DC power supply device into AC power; and
a compressor including a motor to be driven by supply of AC power from the inverter, the compressor being configured to compress a refrigerant inside a refrigeration cycle.

12. An air conditioner comprising:
the DC power supply device according to claim 9;
an inverter to convert DC power output from the DC power supply device into AC power; and
a compressor including a motor to be driven by supply of AC power from the inverter, the compressor being configured to compress a refrigerant inside a refrigeration cycle.

13. An air conditioner comprising:
the DC power supply device according to claim 3;
an inverter to convert DC power output from the DC power supply device into AC power; and
a compressor including a motor to be driven by supply of AC power from the inverter, the compressor being configured to compress a refrigerant inside a refrigeration cycle.

14. The DC power supply device according to claim 1, wherein
for reversing the states of the first switching element and the second switching element, the control circuitry first performs control to turn off the first switching element and turn on the second switching element, performs control to turn off the second switching element after a lapse of a first constant time, performs control to turn on the first switching element after a lapse of a second constant time, and sets the dead time.

15. The DC power supply device according to claim 14, wherein
the control circuitry determines that the first switching element and the second switching element are in the predetermined set of states when the first switching element is off and the second switching element is on at the time of occurrence of the zero-crossing.

16. An air conditioner comprising:
the DC power supply device according to claim 8;
an inverter to convert DC power output from the DC power supply device into AC power; and
a compressor including a motor to be driven by supply of AC power from the inverter, the compressor being configured to compress a refrigerant inside a refrigeration cycle.

17. An air conditioner comprising:
the DC power supply device according to claim 14;
an inverter to convert DC power output from the DC power supply device into AC power; and
a compressor including a motor to be driven by supply of AC power from the inverter, the compressor being configured to compress a refrigerant inside a refrigeration cycle.

18. An air conditioner comprising:
the DC power supply device according to claim 1;
an inverter to convert DC power output from the DC power supply device into AC power; and
a compressor including a motor to be driven by supply of AC power from the inverter, the compressor being configured to compress a refrigerant inside a refrigeration cycle.

* * * * *